United States Patent
Xu et al.

(10) Patent No.: US 8,462,388 B2
(45) Date of Patent: Jun. 11, 2013

(54) IDENTIFYING A COLOR SEPARATION WHEREIN A BANDING DEFECT ORIGINATES

(75) Inventors: Beilei Xu, Penfield, NY (US);
Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 558 days.

(21) Appl. No.: 12/796,375

(22) Filed: Jun. 8, 2010

(65) Prior Publication Data
US 2011/0299099 A1 Dec. 8, 2011

(51) Int. Cl.
*G06F 15/00* (2006.01)
*G06K 1/00* (2006.01)
*H04N 1/60* (2006.01)
*H04N 1/46* (2006.01)

(52) U.S. Cl.
USPC .......................................... 358/1.9; 358/515

(58) Field of Classification Search
None
See application file for complete search history.

(56) References Cited

U.S. PATENT DOCUMENTS

| 2008/0013848 | A1 | 1/2008 | Wu et al. | |
| 2009/0274342 | A1 | 11/2009 | Wu et al. | |
| 2011/0052228 | A1* | 3/2011 | Kozitsky et al. | 399/49 |
| 2012/0212532 | A1* | 8/2012 | Seccombe | 347/10 |

OTHER PUBLICATIONS

U.S. Appl. No. 12/552,519, filed Sep. 2, 2009, Xu et al.

* cited by examiner

*Primary Examiner* — Douglas Tran
(74) *Attorney, Agent, or Firm* — Philip E. Blair; Fleit Gibbons Gutman Bongini & Bianco P.L.

(57) ABSTRACT

What is disclosed is a novel system and method for banding defect detection in user document images to improve image quality trend analysis in multifunction digital imaging system architectures. The present banding detection process uses region-based, time sequence analysis, and graylevels of image regions in a collection of a sequence of regions, to improve banding detection. The present method independently analyzes the colorant separations to detect banding due to sources that are colorant-dependent, e.g., due to a single developer housing. This identification can be performed in the presence of multiple banding defects.

25 Claims, 11 Drawing Sheets

IDENTIFYING A COLOR SEPARATION WHEREIN A BANDING DEFECT ORIGINATES

TECHNICAL FIELD

The present invention is directed to systems and methods for detecting and analyzing banding defects in a color marking system to facilitate the diagnosis of image quality defects in a digital imaging architecture.

BACKGROUND

In digital image print systems, physical alignments, component tolerances, wear and component age can influence the macro-uniformity with which colorants, such as inks and toners, are laid down across the surface of print media. Detection of such print defects helps device operators and system designers ensure the continued production of uniform quality images throughout the life of a document reproduction device. Although some defects impacting image quality may not be entirely visible to the unaided eye, these defects nonetheless indicate that one or more aspects of the print device are no longer performing within acceptable parameters and/or defined tolerances. Banding is one image quality defect which can occur in complex digital document reproduction system architectures. Banding defects are often observed as periodic variations in printing intensity along the printing direction of the digital document reproduction system. Banding defects are visually objectionable image quality artifacts caused by mechanical or electronic defects in the print engine used to render the output image. Banding defects can also "beat" with other frequency components in the print device, such as halftones, to cause objectionable secondary banding defects.

Deterioration in the performance or function of components of a document reproduction system may induce banding defects that are able to be observed in the output of such systems. Often, defects of various components in the document reproduction system will exhibit banding defects in the output of such systems that exhibit a particular frequency. Identification of an increase in amplitude at such particular frequencies in the printed output of a document reproduction system indicates that the component, such as an internal part or subsystem, requires service or replacement. The output of a document reproduction system can be analyzed to identify an increase in amplitude at particular frequencies of banding defects. The identification of a banding defect with significant amplitude at a particular frequency in the output of a document reproduction system indicates that the component or subsystem associated with that frequency requires service or replacement. It is desirable to be able to identify the sources of the banding defects in order to maintain a quality of output for a document reproduction system. It is also important to be able to tell the color separation in which the banding defect is originated because it not only helps pinpoint the sources of the banding defect, but it also improves the accuracy of the estimated amplitudes when the detected amplitudes can be properly weighted by corresponding area coverage.

Accordingly, what is needed in this art are increasingly sophisticated methods to detect and analyze banding defects on user document images to improve real-time image quality trend analysis in digital imaging systems.

INCORPORATED REFERENCES

The following U.S. patents, U.S. patent applications, and Publications are incorporated herein in their entirety by reference.

"Banding Defect Detection In Digital Imaging Systems", U.S. patent application Ser. No. 12/552/519, which teaches a region-based banding detection method.

BRIEF SUMMARY

What is disclosed is a novel system and method for identifying a color separation in which a banding defect originates in a digital imaging system. The present method utilizes region-based banding detection. Simulations show that this technique improves banding detection in color images and the estimated banding amplitudes are close to the estimates obtained from test-pattern images. In practice, only a small fraction of the printing can be allocated to a test pattern on-paper since test pages have no value to the customer. Using real customer pages reduces the use of test pages thereby reducing waste. Image quality values assessed from customer pages are more relevant to the customer. Hence, tracking relevant image quality values is more useful compared to tracking those assessed from test patterns for the purpose of print quality assurance.

In one example embodiment, the present method for identifying a color separation in which a banding defect originates in a digital imaging system involves performing the following. First, a plurality of digital images are scanned. Each of the digital pages corresponds to a page printed by a digital imaging system whereon banding defects are intended to be detected and analyzed. Within each image of the scanned digital images, a plurality of segmented regions are identified. Each segmented region comprises standard image regions. Region-based banding detection is used to detect banding defects in the scanned digital images. In one embodiment, region-based banding detection involves determining banding frequency information from at least one color parameter value within each of the identified segmented regions and estimating a banding amplitude for each recurring banding frequency which repeats within the banding frequency information over the plurality of scanned digital images. Thereafter, banding defects can be detected based upon the estimated banding amplitude and the recurring banding frequency. As an offline process, a set of reference vectors (color values) are constructed from color values measured from test targets. Color values are calculated for each segmented region in which a banding defect has been detected. A color separation is then identified in which each of the detected banding defects originates. This identification is based upon the color vectors (or values) and the reference vectors (or values). In one embodiment, identifying the color separation comprises fitting a vector line (or curve) using a subset of the color values to produce a fitted color vector and comparing the fitted color vector to the set of reference vectors. In another embodiment, identifying the color separation comprises calculating the distances (or differences) between the color values and each reference color values and comparing statistics of these differences among the set of reference color values. The statistics can be, for example, an average, a median, and $95^{th}$ percentile. In various embodiments, a weighting factor is applied to the banding amplitude which can be, for example, a region-average of the identified colorant in original versions of the digital images. Once the color separation wherein each of the detected banding defects originates has been identified, an activity associated with the digital imaging system can then be initiated. The initiated activity can be, for instance, sending a control signal to the digital imaging system, or sending an alert to an operator of the digital imaging system. Various embodiments are disclosed.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1A:
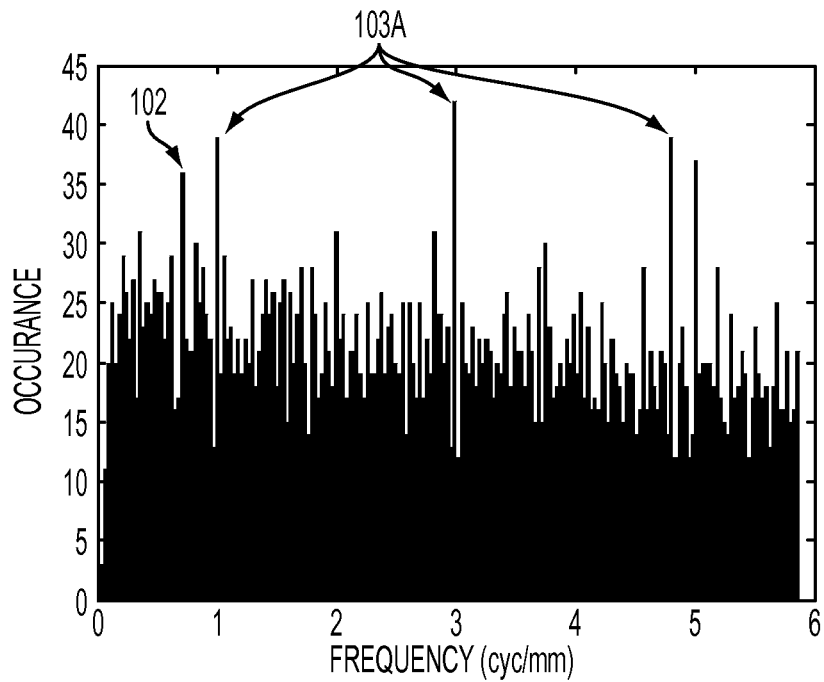
FIGS. 1A and 1B are histograms of detected banding defects from 50 consecutive customer images using L* (FIG. 1A) and a* (FIG. 1B) channels, respectively.

What is disclosed is a novel system and method for identifying a color separation in which a banding defect originates in a digital imaging system. The teachings hereof are an extension of the above-referenced region-based banding method to detect multiple banding defects using color vector analysis. The present method identifies the color separation in which the banding defects originates. This identification can be performed in the presence of single and/or multiple banding defects.

It should be understood that one of ordinary skill in this art should be readily familiar with the digital imaging system quality monitoring and troubleshooting techniques employed herein, particularly those which directly relate to detecting and quantifying banding within a digital imaging system's output, analysis of scanned images to determine banding within an imaging system's output, correlating observed banding to failures within or identification of required maintenance of an imaging system, and frequency analyses of image segments to obtain banding frequency data. Those of ordinary skill would be familiar with the text: "*Digital Color Imaging Handbook*", 1st Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

A "digital imaging system" refers herein to a wide variety of digital imaging system architectures wherein banding defects can or are likely to occur. The set of digital imaging systems to which the present method is directed includes monochrome or color digital document reproduction architectures, document scanning systems, a wide variety of printers/copiers, book/magazine/newspaper, digital printing presses, and other multi-function document reproduction systems. Such systems generally include a display device such as a CRT or touch screen along with one or more user interfaces such as a keyboard, mouse, keypad, touchpad, and the like, for entering data and configuring device-specific settings to optimize image quality and performance. Such complex devices further incorporate an image processing or color management system for processing image data. The image processing system can be a hardware or software construction which preferably resides in the image path of the device. It should also be understood that one or more functions, features, or capabilities performed by a computer system or special purpose processor (such as an ASIC) performing one or more aspects of the present banding defect detection and trend analysis method, as described more fully herein, may be integrated, in whole or in part, with any system or sub-system of such a digital imaging system.

"Segmentation" is a process of partitioning a digital image into multiple segments. One goal of segmentation is to simplify and/or change the representation of the digital image into something that can be more easily analyzed. A result of image segmentation is a set of segments that collectively cover the image or a set of contours extracted from the image. Image segmentation is typically used to locate objects and/or boundaries (i.e., lines, curves, etc.) in the received image. Typically, a label is assigned to every pixel in the image such that pixels with the same label share certain visual characteristics. Each of the pixels in a region is similar with respect to some characteristic or property, such as close proximity, color, intensity, or texture. Adjacent regions tend to be different with respect to these same characteristic(s). Several general-purpose algorithms and techniques have been developed for image segmentation. Since there is no general solution to the image segmentation problem, these techniques often have to be combined with domain knowledge in order to effectively solve an image segmentation problem for a given problem domain.

A "Banding Defect" (or simply "Banding") refers to an observable defect contained within an output print of a digital imaging system. Banding defects are visually perceptible periodic lines, or more generally as periodic bands, observed in solid or halftone pattern area fills that do not appear smooth. These can be a result of defects or wearing-out of mechanical or electronic components in a digital imaging system or by the printer advancing the media too much or too little. When observing the intensity of colors (e.g. L*/a*/b*) of an image print, banding defects appear as periodic "light" and "dark" patterns at specific frequencies masked by the image content. This uneven pattern of the intensity of colors is especially objectionable at regions with near-uniform colors at around mid-tone of an image print. Since user images have different content from one region to another (or from page to page), frequency components contributed by the image content are less likely to repeat. However, for a banding defect, the particular frequency will often appear over and over again in differing regions within a given page and over a sequence of pages. When the image contents are busy with rich frequency components, banding defects tend to be more difficult to detect. Certain images may also be less sensitive to banding defects. Although scanned images of multiple (unknown) customer pages are correlated and the colorant (CMYK) separations are analyzed independently to detect banding due to sources that are colorant-dependent, e.g., due to a single developer housing, it should be understood that detection will be in RGB or LAB, not in CMYK directly.

"Banding Frequency" refers to a frequency at which a banding defect occurs in an output print and is generally related to an inverse of a period between extrema observed in the printed output.

"Banding Frequency Information" refers to information describing the banding frequencies, amplitudes, and optionally phases exhibited in an output print and are able to be obtained, for instance, by performing a Fourier transformation of the image data.

A "Color Parameter Value" is a value that parametrically expresses a produced or sensed color. Example color parameter values include, for example, a value of graylevel in lightness or hue, a value for one component (or a combination of components) in RGB, LAB, or CMYK color systems, or a value in any parametric representation of color.

"Banding Amplitude" refers to a measure of a difference between minima and maxima of a color parameter value that is caused by banding.

A "Standard Image" refers to image segments within a document that do not share image frequency components having appreciative amplitudes with other images within the document and/or do not have image frequency components that may interfere with banding detection. For example, images containing text have a frequency component with appreciable amplitude at the text line rate. Other image that contain text with the same line rate also have an appreciable amplitude at that frequency component, and therefore those two images share image frequency components having appreciative amplitudes with other images within the document and would be excluded in the banding analyses. In another example, images with a graphic element such as line drawings or sharp edges containing high frequency components with high amplitudes that would tend to degrade the ability to detect banding are excluded from standard images. One method to extract Standard Images is to first identify a characteristic "type" of an image object, such as text, blank, graphics, and pictorials in the document and use only the image objects identified as graphics and pictorials as a standard image. Another method is to identify halftone regions as regions to be analyzed while excluding blank and solid regions as standard images. Yet another method is to identify near-uniform regions, i.e. a contiguous region with color values of each pixel falling within a threshold range of a mean color of the region, as standard images via color clustering techniques (such as K-mean) and the use of morphological filters. The selection of Standard Images in the below described processing is able to be based on the characteristics of the type of banding defects that are desired to be detected, such as banding defects that fall within a particular frequency and amplitude range.

BRIEF GENERAL DISCUSSION

As discussed in the background section hereof, multiple banding defects can occur simultaneously in a print due to defects or worn-out of various mechanical or electronic components in the marking engine. These might have different frequencies, but most affect only a single separation rather than all 4 colors. Conventional RGB scanning of image prints makes it difficult to identify the color separation in which the banding defect is from. What is provided herein is an extension to the region-based banding detection method disclosed in the above-referenced co-pending "Banding Defect Detection In Digital Imaging Systems", to detect multiple bandings directly from customer images. The present method tries to identify banding sources such as the color separation in which a banding defect is from based upon color vector analysis. The method hereof consists of the following primary steps: 1) Reference color vectors are constructed in a desired color space (e.g. L*a*b*) for C, M, and Y separations using test targets. 2) Region-based banding detection is used to detect banding defects presented in customer images. Banding defects that have amplitudes above preset threshold levels are detected from each segmented region. 3) The color separation in which the banding defect is from is identified using color vector analysis. For color images, the steps 2) and 3) are repeated for all color channels (L*a*b*) for the segmented regions defined based on, for example, the L* image only.

In our simulation, two banding defects were simulated in a set of 1000 customer images in CMYK color space, where a 0.7 cyc/mm sinusoidal wave was added to the K channel and a 1 cyc/mm square wave was added to the C channel. A square wave is used to simulate many real world banding defects, in which one would expect to see multiple higher-order harmonics in addition to the fundamental frequency, such as the once-around ROS banding. The images were then converted into L*a*b* color space to simulate a typical scanning process. Applying the region-based method, several banding defects were detected. In FIG. 1A, arrow 102 indicates the 0.7 cyc/mm banding defect in K and arrows 103A point at the fundamental and higher-order harmonics of the 1 cyc/mm banding defect in C. This is also shown at 103B of FIG. 1B. It is often difficult to detect the higher-order harmonics because these often have much lower amplitudes than the fundamentals and pre-determined threshold values may fail to detect the defects. However, if the fundamental frequencies are known, the amplitudes can be extracted near the expected harmonics frequencies.

Figure 2A:
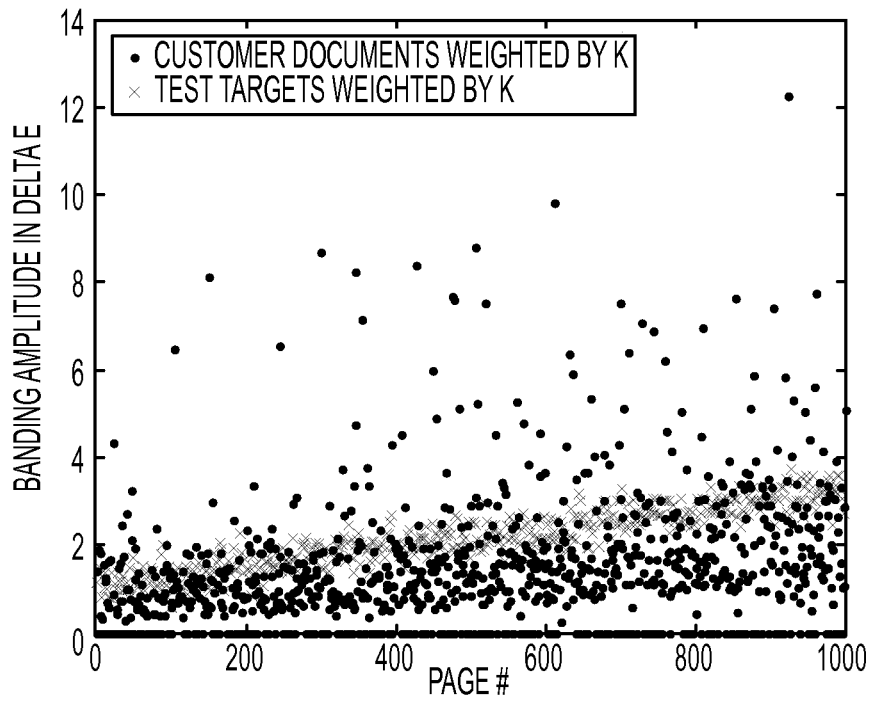
FIGS. 2A and 2B show a comparison of the estimated amplitudes of the 0.7 cyc/mm banding in K when its obtained amplitudes are weighted by the region-average of K in the original (FIG. 2A) or region-average of L* in the scanned documents (FIG. 2B)
Figure 2B:
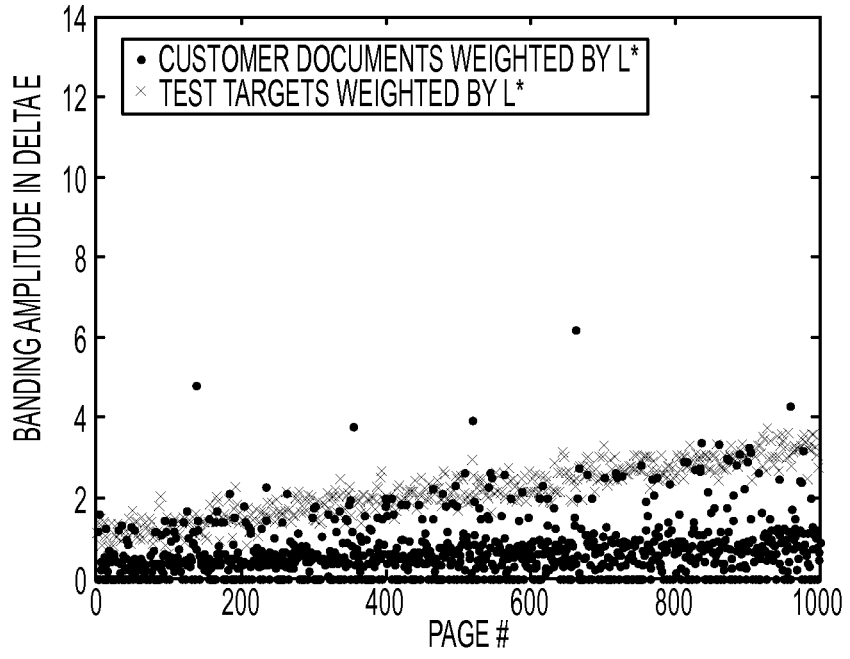

In the above-referenced banding detection case, it was demonstrated that it is important to weigh the detected banding amplitude with the average area coverage of the region to avoid over-estimating or under-estimating the true banding amplitude. This is especially important when monitoring the image quality (IQ) performance over many customer images in which the image content varies significantly from page-to-page. The weighting reduced variations of the estimated amplitudes due to image content variations in customer documents. For color images, it becomes more difficult to determine the proper weighting factor of the detected banding amplitudes without knowing the color separation in which the banding defects are originated. FIGS. 2A and 2B show a comparison of the estimated amplitudes of the 0.7 cyc/mm banding in K when its obtained amplitudes are weighted by the region-average of K in the original (FIG. 2A) or region-average of L* in the scanned documents (FIG. 2B). By a comparison of the estimated amplitudes of the 0.7 cyc/mm banding in K when its obtained amplitudes are weighted by the region-average of K in the original (A) or region-average of L* in the scanned documents (B), it can be demonstrated that when the extracted amplitudes are weighted by the region-average of K in the original documents, the estimated amplitudes are much closer to the estimated amplitude using K-only test targets. The teachings hereof are intended to overcome this by identifying the color separation in which the banding is originated by using color vector analysis.

Figure 3:
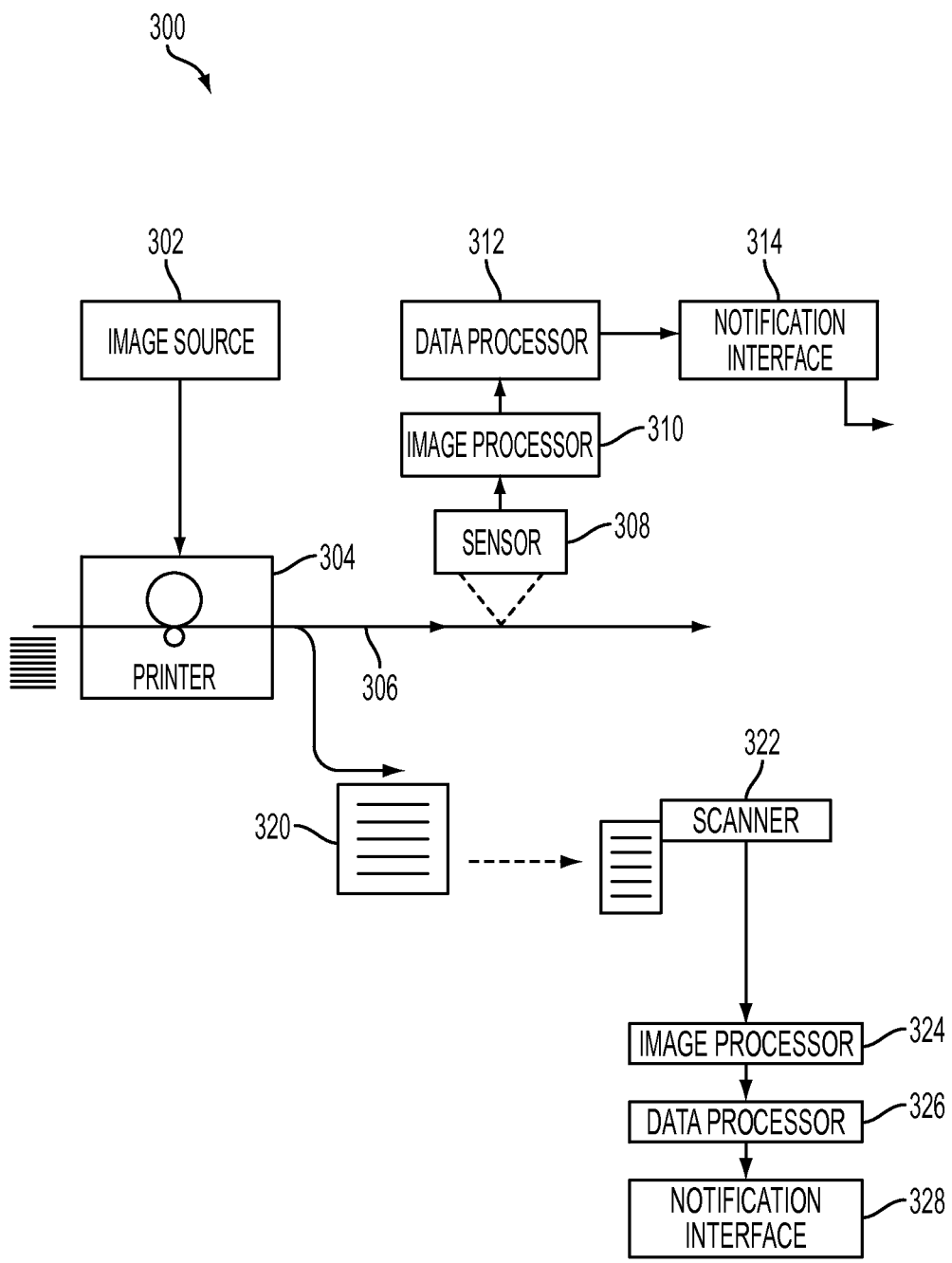
FIG. 3 illustrates a functional block diagram for an example system suitable to implementing one embodiment of the present method to improve image quality trend analysis.

Reference is now made to FIG. 3, which illustrates a functional block diagram for a system suitable to implementing an embodiment of the present invention.

System 300 includes a printer 304 that receives digital image data defining a plurality of digital images from an image source 302. The digital images of one embodiment define a plurality of images that each represents one page to be printed by printer 304. The images that define each page printed by the printer are able to contain regions that contain text data as well as standard image regions. Standard image regions are able to include, for example, graphical data, photographic images, and other similar non-textual data and non-background area. The digital image data contains user-provided data that are desired to be printed by a user and do not contain images that are intended to only characterize banding defects within the printed output. Printer 304 produces pages 306 onto which corresponding user image data are printed. When components of the printer wear or begin to fail, for example, the pages produced may contain banding defects as a result. The pages produced by the printer are provided in one embodiment to a sensor 308. The sensor scans the pages and produces an electronic representation of the image printed on each page. These electronic representations are provided to an image processor 310. The image processor processes the electronic representations of the images and identifies standard image regions within each image corresponding to a page. The data representing the identified standard image regions detected by the image processor are, in turn, provided to data processor 312. The data processor processes the data representing the identified standard image region data in order to identify targeted banding defects being exhibited by the printer. The data processor initiates an activity in response to detection of a banding defect. Such activities are able to include, for example, sending a control signal to the printer or sending an alert to an operator through a notification interface 314. The notification interface is able to, for example, flash a light or sound an audible alarm, display messages on a device control panel or operator's station, and send text/email messages to service personnel responsible for maintenance of the printer. The notification interface may further contact a key operator of the device or a manager thereof via, for example, a cellular communications link and play a pre-packaged message or leave a voicemail. Other embodiments hereof are intended to fall within the scope of the appended claims.

In an alternative, the printer 304 produces printed output consisting of multiple printed sheets that are delivered into an output bin 320. The multiple printed sheets delivered into the output bin are then transferred to a scanner 322 which scans the multiple printed sheets and produces an electronic representation of the image printed on each page. These electronic representations are provided to an image processor 324, which in one embodiment is similar to the image processor 310 described above. The data representing the identified standard image regions detected by the image processor are, in turn, provided to data processor 326, which is similar to the data processor 312 discussed above. The data processor processes the data representing the identified standard image region data in order to identify targeted banding defects being exhibited by the printer. As is described herein further, the data processor initiates, in response to detection of a targeted banding defect, an activity. Such activities are able to include, for example, sending a control signal to the printer 304 or sending an alert to an operator through a notification interface 328, which is similar to the notification interface 314 described above.

Figure 4:
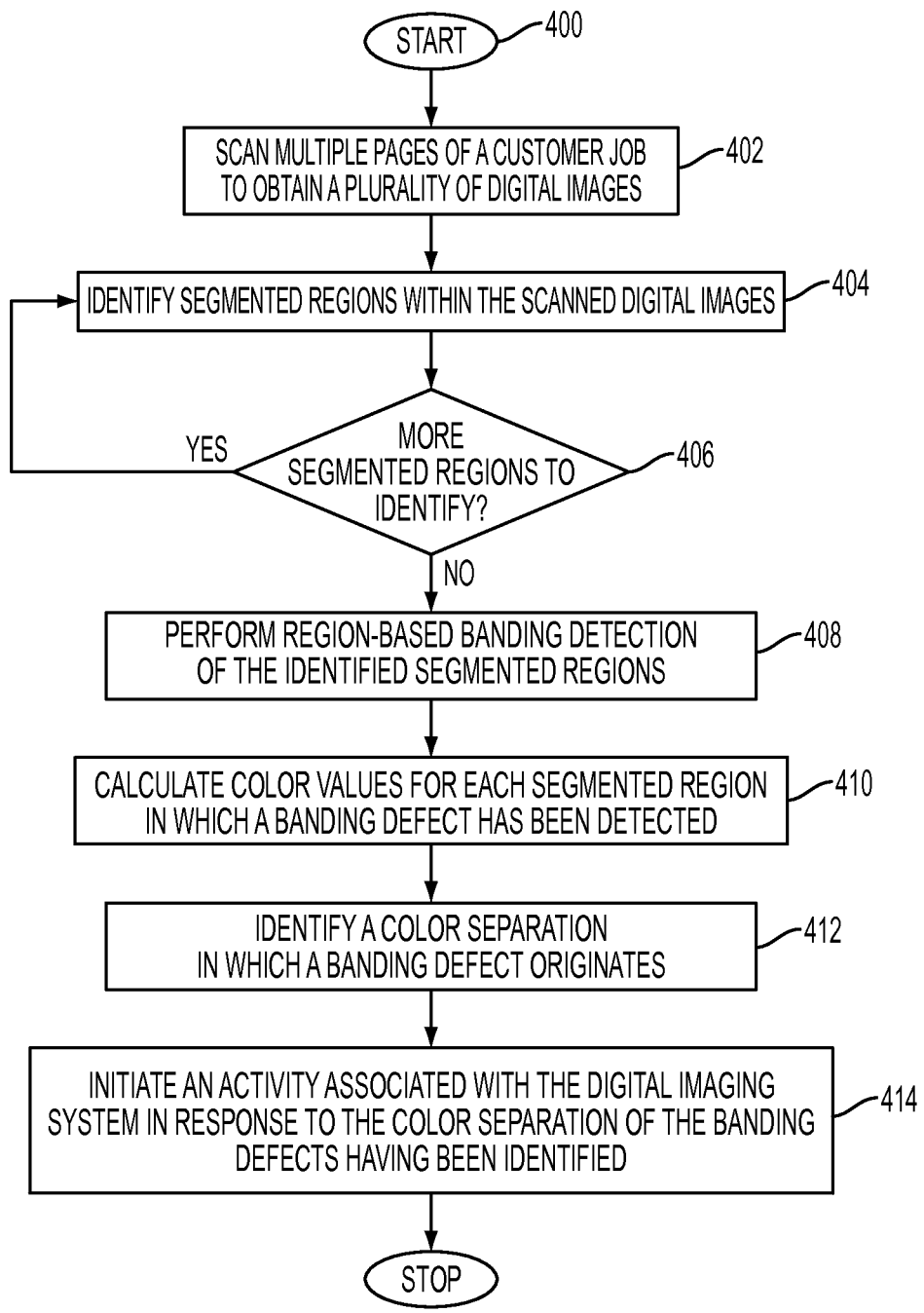
FIG. 4 is a flow diagram of one example embodiment of the present method for identifying a color separation in which a banding defect originates.

Reference is now being made to the flow diagram of FIG. 4 which illustrates one example embodiment of the present method for identifying a color separation in which a banding defect originates in a digital imaging system. Flow processing begins at step 400 and immediately proceeds to step 402.

Figure 5:
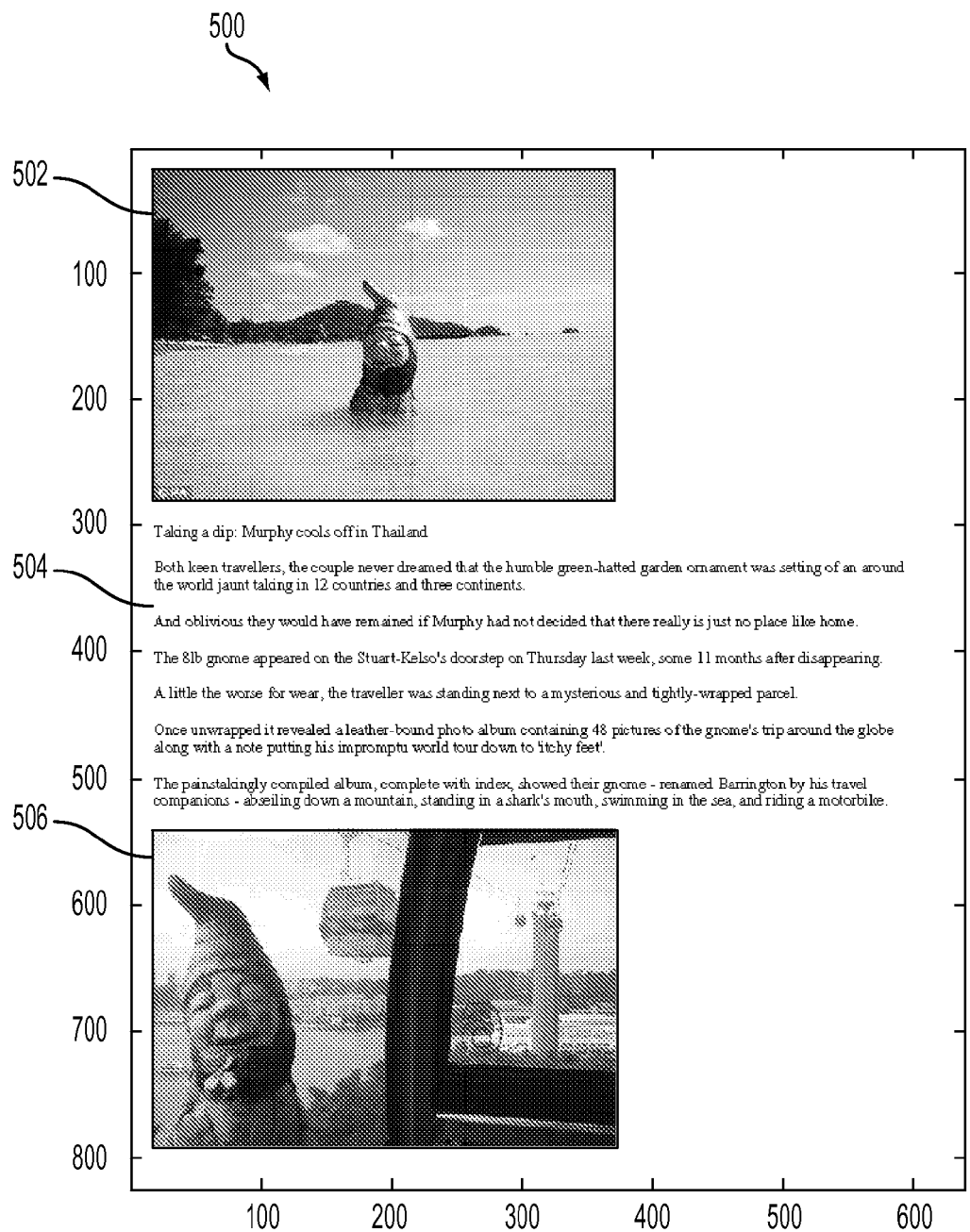
FIG. 5 illustrates an example image obtained by scanning a page printed by a printer.

At step 402, scan multiple digital images printed using a digital color scanning system whereon a banding defect analysis is intended to be performed. Each of the digital images corresponds to a printed page of, for example, a customer job. As described above with reference to FIG. 3, one embodiment scans pages produced by printer 304 utilizing sensor 308. FIG. 5 shows an example image 500. The example image of FIG. 5 has a first region 502, a text region 504, and a second region 506. The first and second regions comprise standard image regions, and text region 504 contains lines of illustrative text.

Figure 6:
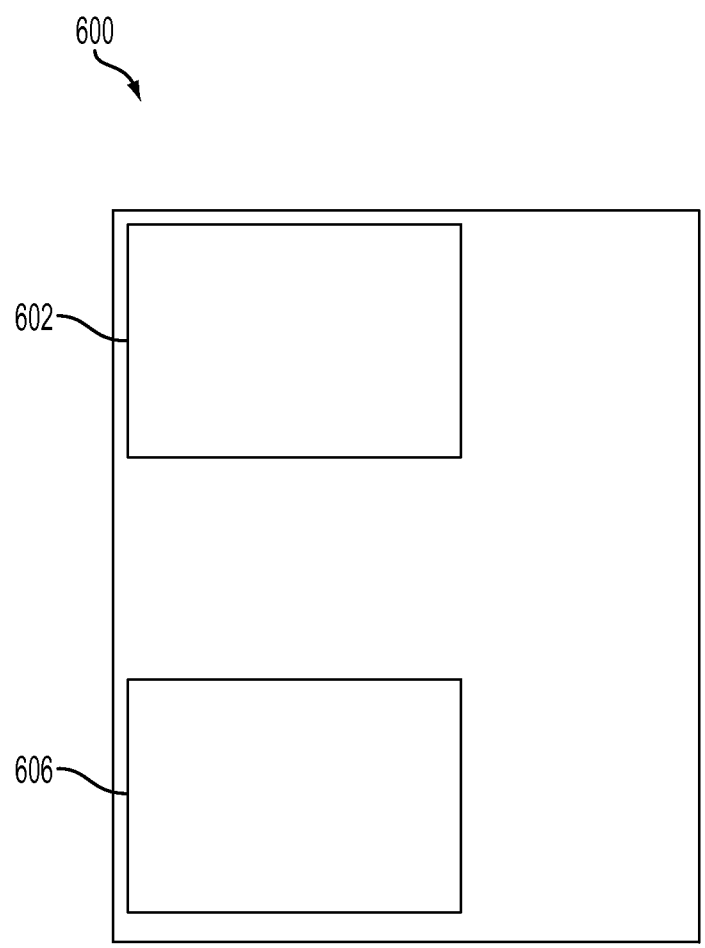
FIG. 6 illustrates the identified segmented regions of the example image of FIG. 5.

At 404, within each of the multiple digital images, identify a segmented region. Identified segmented regions are standard image regions. In FIG. 6, the identified segmented regions 600 of image 500 are illustrated. The identified segmented regions are shown having a first segmented region 602 and a second segmented region 606. The text region between these two segmented regions has been discarded. Some segments may be merged based upon a respective size of the segments. Smaller segmented regions can be merged because smaller regions provide limited frequency resolution for banding frequency analyses, due to the size of those regions. Merging of segmented regions is preferable when a distance between the segmented regions is smaller than the period exhibited by one or more targeted banding defects. Merging of segmented regions can be carried out at different resolution levels.

At step 406, a determination is made whether all the segmented regions have been identified. If not then processing repeats with respect to step 404 wherein a next segmented region is identified. Processing continues in an iterative manner until all the segmented regions have been identified within all of the scanned multiple digital images. Otherwise, processing continues to step 408.

Figure 1B:
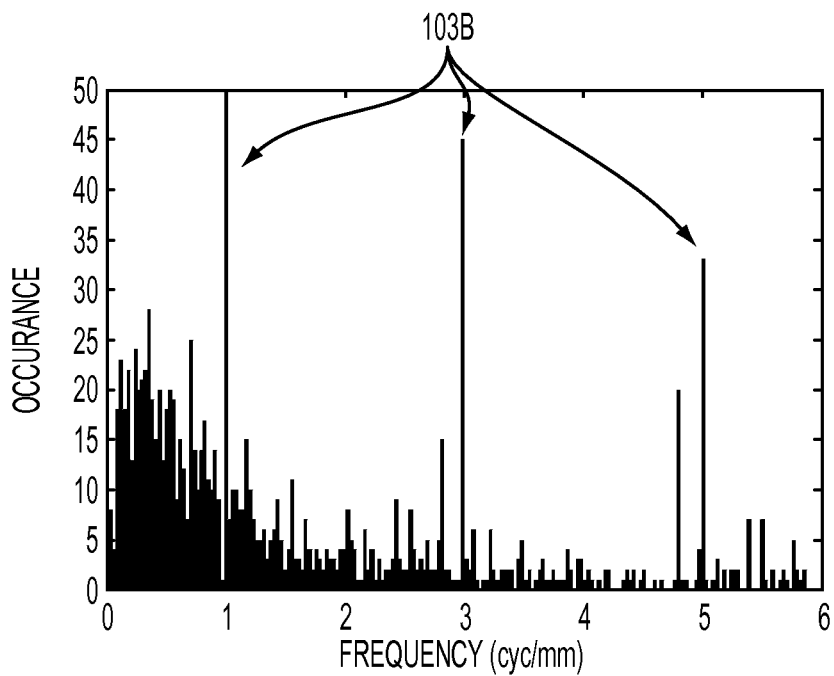

At step 408, region-based banding detection is performed to detect banding defects in any of the identified segmented regions. Region-based banding detection involves determining banding frequency information from color parameter values within each of the identified segmented regions and then estimating a banding amplitude for banding frequency which repeat within the banding frequency information over the plurality of digital images. Thereafter, banding defects are detected based upon the estimated banding amplitudes and the recurring banding frequencies. Many marking systems provide a list of observed banding frequencies that correspond to known conditions within the system. When such recurring frequencies are provided, banding frequency detection is able to be directed to spectral areas in a vicinity of frequencies of interest. If a specification of a frequency of interest has not been received or otherwise provided, frequencies at which appreciable banding defect amplitudes are observed can be identified in the alternative. Determining banding frequency information includes performing a Fourier transform for each of the segmented regions to determine the amplitude of frequency components within each region. In general, for a banding defect being induced by a failed or deteriorated component, the particular frequency of the banding defect will likely appear over and over again in all of the segmented regions both within a given page and across pages under test. A peak detection of a Fourier transform of the color values for each region can be used to estimate the banding amplitudes. Once the amplitude of a banding defect is estimated within each segmented region, the overall banding amplitude can be estimated for the entire page and harmonic relationships can be identified based on their frequencies (i.e. multiples of the fundamentals). For example, the 0.7 cyc/mm banding in L*, indicated by the arrow 102 in FIG. 1A, is identified as one banding defect while 3 banding defects, indicated by the arrows 103A and 103B in FIGS. 1A and 1B, are identified as the second 1 cyc/mm banding based on their frequencies and their harmonic relationship with each other. In this example, using region-based banding detection, two banding defects are identified. It should be appreciated that the use of additional information from known sources is helpful for detecting banding with low amplitude in a noisy measurement, low SNR. Once banding defects have been detected in the segmented regions, we next need to identify which one of the color channels the banding defects originate. The present method utilizes color vector analysis to identify the color separations in which the banding defects originated. Although all color channels (C, M, Y, and K) can be identified by the same vector analysis, the K channel can also be identified in a preprocess step before using the vector analysis to identify C, M, and Y.

Figure 8A:
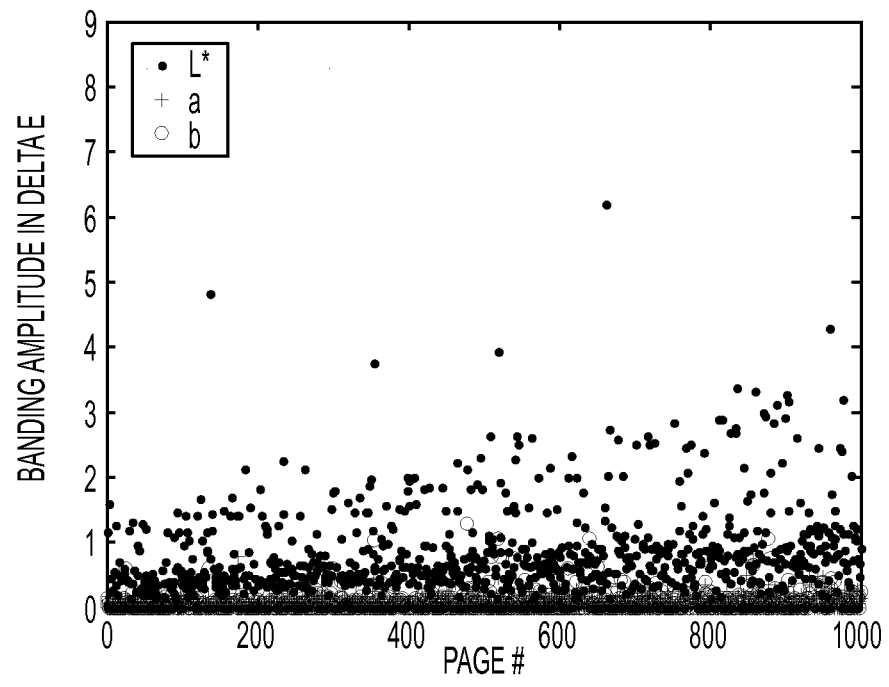
FIGS. 8A and 8B shows the estimated banding amplitudes in L*, a* and b* for the 0.7 cycle/mm banding defect in K and the 1 cycle/mm banding defect in C, respectively.
Figure 8B:
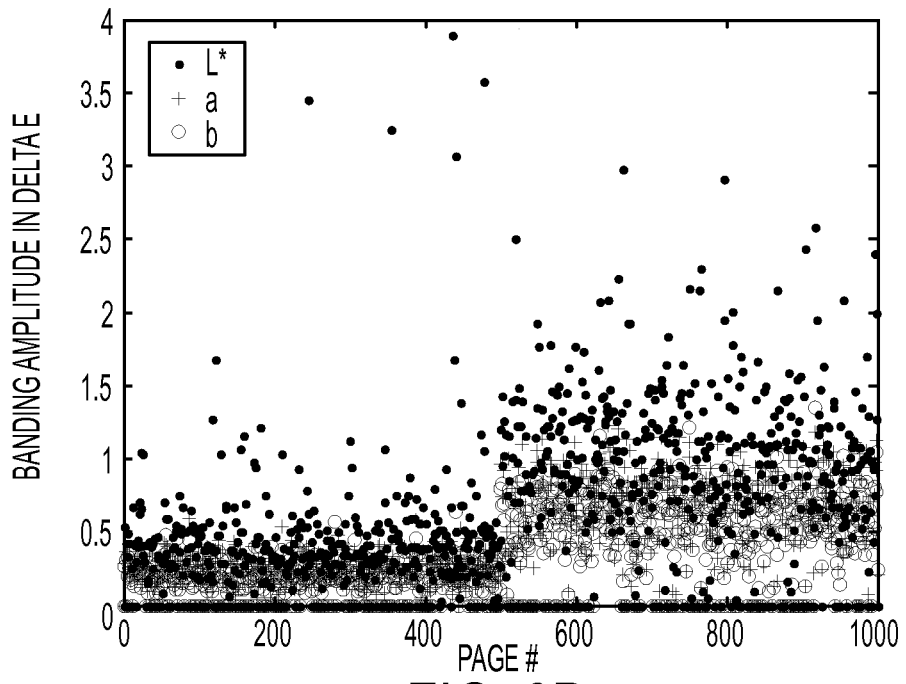

FIGS. 8A and 8B shows the estimated banding amplitudes in L*, a* and b* for the 0.7 cyc/mm banding defect in K and the 1 cyc/mm banding defect in Cyan, respectively. As it is shown in FIG. 8A, when the banding defect is K only, the extracted banding amplitudes in L* is much greater than the estimated amplitude in a* or b* channels. The amount of a* or b* can be determined by pre-measuring banding amplitudes at a frequency where there is no banding present at that frequency. This detection can be further confirmed in the process when a B/W image is recognized in the job stream. There are multiple ways to identify B/W images/regions. One preferred embodiment is to examine the a* and b* distribution/range in the given region. If the region is not mostly neutral based on a*/b* distribution, it is not a K-only region. If yes, it is likely to be neutral (the confidence can be measured based on how many large chroma, e.g. $a^{*2}+b^{*2}$, pixels in the region). This is because that in a microscopic level (e.g. 300 DPI), halftone dot structure can still be observed, we can thus differentiate neutral from K only vs. neutral from CMY only by looking at a* and b* distribution/range at the pixel level. Comparing the banding amplitudes in L*, a*, and b* in FIG. 8A, the amplitude in L* is dominant for the 0.7 cyc/mm frequency banding, which hints that the defect is most likely to come from the K channel. A further examination shows that there are two groups of banding amplitudes, one is higher and one is lower when they are weighted by the average of L* of the region. The higher amplitudes were actually from B/W images in the set, hence the weighting by L* is equivalent to weighting by the K.

Figure 9:
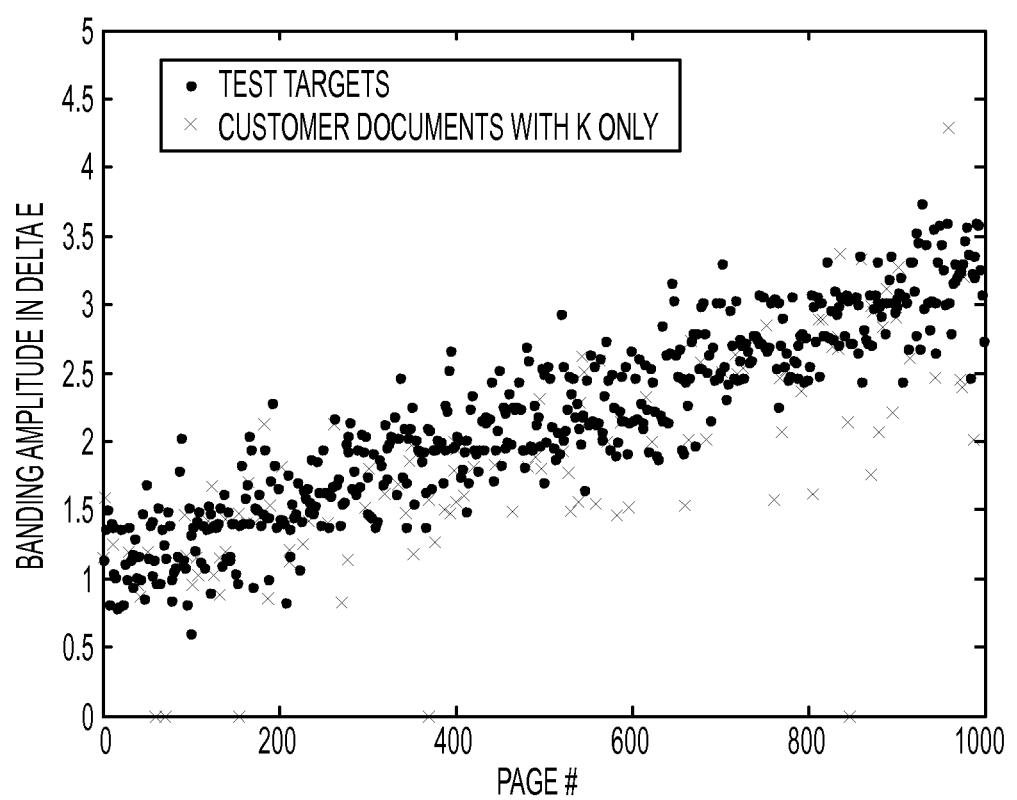
FIG. 9 shows the estimated banding amplitudes from B/W images compared with estimations using test targets.

FIG. 9 shows the estimated banding amplitudes from B/W images compared to the estimations using test targets.

Figure 7:
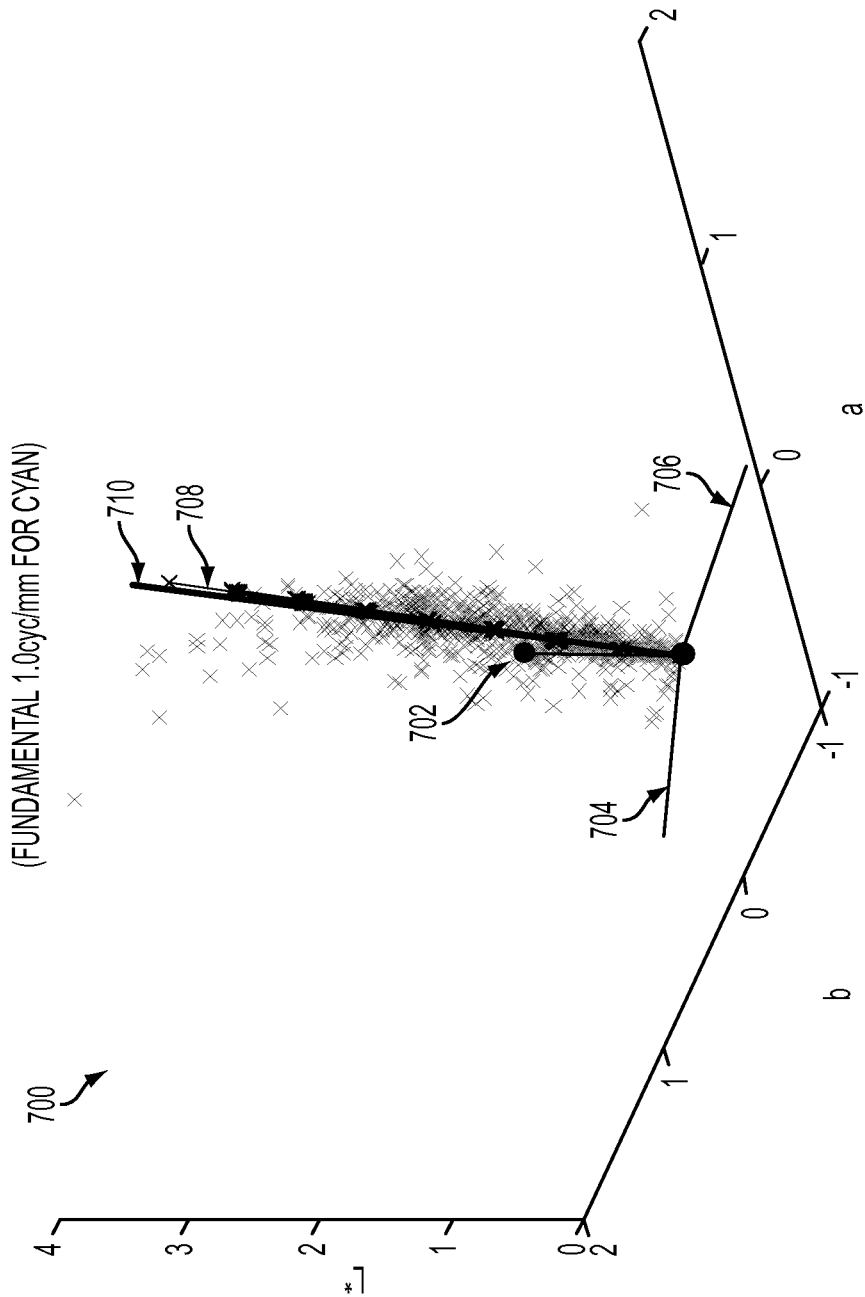
FIG. 7 shows the extracted banding vectors in L*a*b* space comparing to reference color vectors in Cyan (702), Magenta (704), and Yellow (706) vectors and the extracted banding vector using test targets.

Once any banding defects originate from K are identified, the remaining banding defects are processed through the color vector analysis. A set of reference vectors are constructed from color values measured from a plurality of test targets offline. The set of reference vectors can be constructed or otherwise retrieved from memory or storage. The test targets can be as simple as having only paper white and solid colors of C, M or Y. FIG. 7 shows the extracted banding amplitudes using a set of test targets in L*a*b* space 700. The reference color vectors are: in Cyan 702, in Magenta 704, and in Yellow 706. Once the reference color vectors have been obtained, color values of the banding defects need to be calculated and plotted.

At step 410, color values are calculated for each detected banding defect for each of the segmented regions. The color values, shown as clustered x's in FIG. 7, represent the measured banding amplitudes in L*a*b* values of the 1 cyc/mm banding defects detected from the scanned customer pages.

At step 412, a color separation is identified in which a detected banding defect originates. It should be appreciated that the identification of K and the identification of C or M or Y can be separate steps as only the latter require color vector analyses. Identification is based upon the color values and the reference vectors. Attention is directed to FIG. 7. Fitted color vector 708 was constructed using a cyan test target (at 50% graylevel) with simulated banding defects at 1 cyc/mm. Fitted vector 708 points in a substantially same direction as the direction of Cyan reference vector 702 (as opposed to the directions pointed to by the Magenta vector 704, and the Yellow reference vector 706). Notice that the clustered x's aligned substantially with the direction of the Cyan reference vector 702. Fitted color vectors can be calculated for each L*a*b* value (i.e. measured banding from each region in the set of customer images) and a direction of the vector compared to the set of reference vectors. Alternatively, the color vectors can be averaged over a subset of regions/images and a mean vector compared to the reference vectors but this method is less precise. The vector shown at 710 is an example average vector.

Once the fitted color vector from the customer documents is constructed, vector difference to the reference vector is calculated and the smallest distance between the measured vector and one of the reference vectors indicates the color separation in which the banding defect originated. In another embodiment, identifying the color separation comprises calculating the distances between the color values and each reference color value and comparing the statistics of the distances among the set of reference color values. The statistics, can be, for example, an average, a median, and $95^{th}$ percentile. Color separation identification can be performed for all images in the customer's job stream on a page-by-page/region-by-region basis, and the color values re-calculated and the plot of FIG. 7 updated as new pages of the customer's job are scanned. Alternatively, this can be performed for only a small subset of images (20-50 pages/regions) and applied to all subsequent banding defects having a same or substantially similar banding frequency.

Table 1 compares the estimate banding amplitudes between test target and customer images for all the detected banding defects for Cyan. Here, two levels of banding were simulated across 1000 pages. In the first 500 pages, the amplitude of the square banding is lower and then an abrupt change occurs at page 501. Thus the results labeled as $1^{st}$ refer to the results from page 1~500, while the results labeled as $2^{nd}$ refer to the results from page 501~1000.

|  | Test Targets | Customer Documents |
| --- | --- | --- |
| Fundamental (1st) | 0.77 +/− 0.17 | 0.77 +/− 0.59 |
| Fundamental (2nd) | 2.31 +/− 0.18 | 2.29 +/− 1.14 |
| 1st Harmonic (1st) | 0.26 +/− 0.06 | 0.25 +/− 0.15 |
| 1st Harmonic (2nd) | 0.77 +/− 0.06 | 0.75 +/− 0.36 |
| 2nd Harmonic (1st) | 0.15 +/− 0.04 | 0.16 +/− 0.10 |
| 2nd Harmonic (2nd) | 0.46 +/− 0.04 | 0.46 +/− 0.25 |

Once the color separation in which the banding defect originated is identified, the extracted banding amplitudes can be weighted by the area coverage of the corresponding color separation to improve the estimation of the banding amplitudes and more importantly, enable the comparison of banding amplitudes when the image content/color varies from page-to-page. When the originals are available, the average area coverage can be calculated from the original images. When the originals are not available, the average area coverage can be estimated by using an inverse printer model that is readily available in the ICC destination profile for color management of the printer.

Figure 10A:
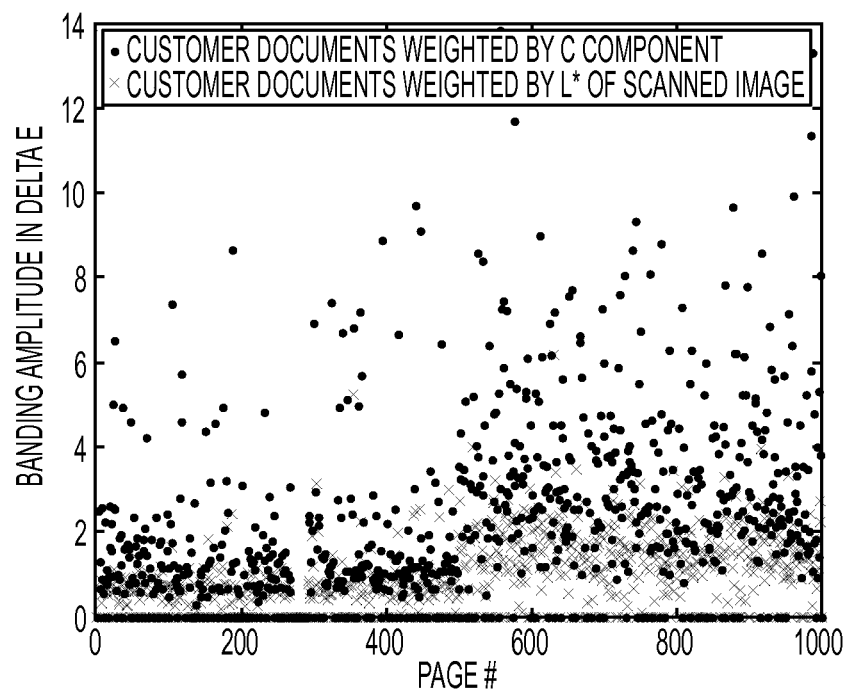
FIGS. 10A and 10B show estimated banding amplitudes of 1 cyc/mm banding defects when weighted by L* (FIG. 10A) and by C component in the original documents (FIG. 10B)

FIG. 10A shows the comparison when the extracted banding amplitudes are weighted by L* or the Cyan area coverage in the original images.

Figure 10B:
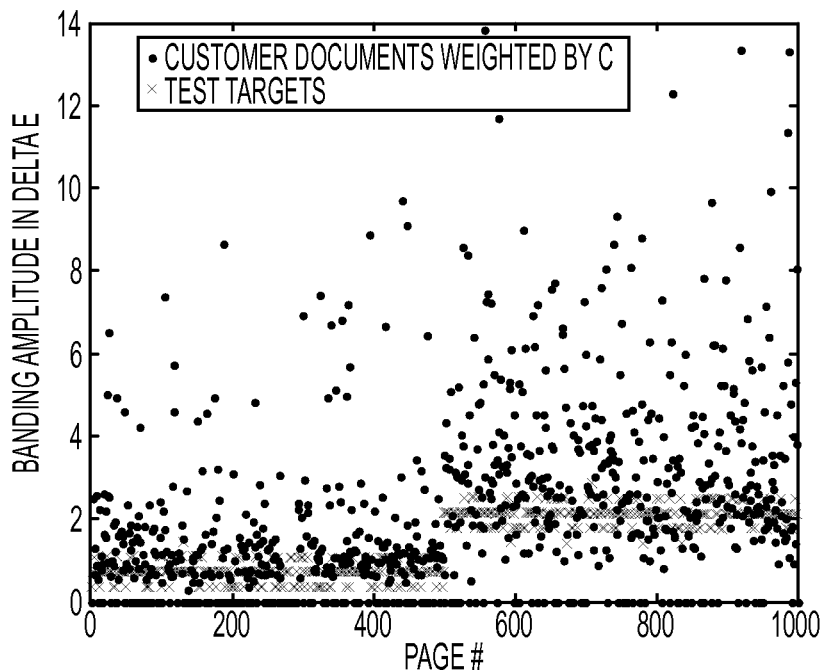

FIG. 10B shows that the estimated banding amplitudes are close to the estimates from test target when the extracted amplitudes are weighted by Cyan.

At step 414, an activity associated with the digital imaging system can be initiated in response to a color separation having been identified for the banding defect(s). In one embodiment, the initiated activity comprises an alert such as, for example, an audible sound, light flashing, a message a display on an operator information screen or control terminal, or an email, text, or phone message sent. Alternatively, any suitable indication activity can be given to an operator, customer service representative, manufacturers representative, a manager, and the like. Such an alert may include further information such as, for instance, an indication of a deterioration of one or more components, or an indication based upon the recurring banding frequency, and the like. A networked database or local storage may further be queried for a list of possible solutions or actions to be taken based upon the identified information which precipitated the alert. Such alternatives are intended to fall within the scope of the appended claims.

It should be understood that the flow diagrams hereof are intended to be illustrative. Other operations may be added, modified, enhanced, or consolidated. Variations thereof are intended to fall within the scope of the appended claims.

Figure 11:
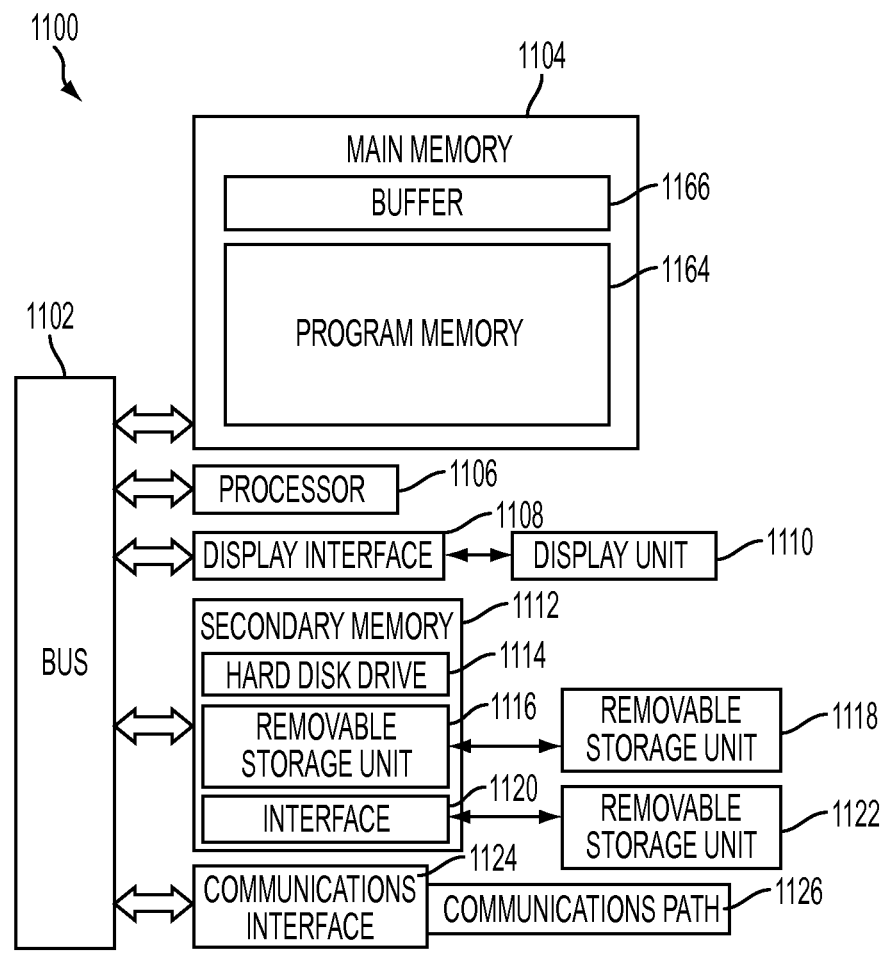
FIG. 11 illustrates a block diagram of one example embodiment of a special purpose computer useful for implementing one or more aspects of the present banding defect detection and trend analysis method.

Reference is now made to FIG. 11 which illustrates a block diagram of one example embodiment of a special purpose computer useful for implementing one or more aspects of the present method. Such a system could be implemented as a separate computer system, an electronic circuit, or an ASIC, for example. The nature of the implementation will depend on the processing environment wherein the present method finds its intended uses. The special purpose computer system would execute machine readable program instructions for performing various aspects of the present method as described herein.

Special purpose computer system 1100 includes processor 1106 for executing machine executable program instructions for carrying out all or some of the present method. The processor is in communication with bus 1102. The system includes main memory 1104 for storing machine readable instructions. Main memory may comprise random access memory (RAM) to support reprogramming and flexible data storage. Buffer 1166 stores data addressable by the processor. Program memory 1164 stores machine readable instructions for performing the present method. A display interface 1108 forwards data from bus 1102 to display 1110. Secondary memory 1112 includes a hard disk 1114 and storage device 1116 capable of reading/writing to removable storage unit 1118, such as a floppy disk, magnetic tape, optical disk, etc. Secondary memory 1112 may further include other mechanisms for allowing programs and/or machine executable instructions to be loaded onto the processor. Such mechanisms may include, for example, a storage unit 1122 adapted to exchange data through interface 1120 which enables the transfer of software and data. The system includes a communications interface 1124 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1126 which carries such signals and may be implemented using wire, cable, fiber optic, phone line, cellular link, RF, memory, or other means known in the arts.

It should be understood that one or more aspects of the present method are intended to be incorporated in an article of manufacture, including one or more computer program products. The article of manufacture may be included on a storage device readable by a machine architecture, xerographic system, color management or other image processing system, any of which capable of executing program instructions containing the present method. Such an article of manufacture may be shipped, sold, leased, or otherwise provided separately either alone or as part of an add-on, update, upgrade, download, or product suite by the assignee or a licensee hereof as part of a computer system, xerographic system, document processing system, image processing system, color management system, operating system, software program, plug-in, DLL, or a storage device.

It will be appreciated that the above-disclosed features and function and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for identifying a color separation in which a banding defect originates, the method comprising:
   scanning a plurality of digital images, each corresponding to a page printed by a digital imaging system whereon banding defects are intended to be detected and analyzed;
   identifying, within each image of said scanned digital images, a plurality of segmented regions each comprising standard image regions of each image;
   using region-based banding detection to detect banding defects in said plurality of scanned digital images;
   calculating color values for each segmented region in which a banding defect has been detected;
   identifying a color separation in which each of said detected banding defects originates based upon said color values and a set of reference vectors; and
   initiating an activity associated with said digital imaging system in response to a color separation of the banding defect having been identified.

2. The method of claim 1, wherein said region-based banding detection comprises:
   determining banding frequency information from at least one color parameter value within each of said identified segmented regions;

estimating a banding amplitude for each recurring banding frequency which repeats within said banding frequency information over said plurality of scanned digital images; and detecting at least one banding defect based upon said estimated banding amplitude and said recurring banding frequency.

3. The method of claim 1, further comprising applying a weighting factor to said banding amplitude comprising any of: a region-average of K in original versions of said digital images, and a region-average of L*in said scanned digital images.

4. The method of claim 1, further comprising applying a weighting factor to said banding amplitude comprising an average area coverage of the segmented region wherein said banding defect originated.

5. The method of claim 4, wherein said average area coverage is estimated using an inverse printer model in an ICC destination profile of said digital document system.

6. The method of claim 1, wherein identifying said color separation in which said detected at least one banding defect originates comprises:
fitting a line using a subset of said color values to produce a fitted color vector; and
comparing said fitted color vector to said set of reference vectors, wherein a smallest difference between said fitted color vector and one of said reference vectors indicates the color separation in which said identified banding defect originated.

7. The method of claim 1, wherein identifying said color separation in which said detected at least one banding defect originates comprises:
calculating the distances between the color values and each reference color vector; and
comparing the statistics of said distances among said set of reference color values, the statistics including at least one of: average, median, and 95 percentile.

8. The method of claim 1, wherein said activity comprises any of: sending a control signal to said digital imaging system, and sending an alert to an operator of said digital imaging system, wherein said alert comprises any of: an indication of a deterioration of at least one component of said digital imaging system, and an indication of at least one part, based upon said recurring banding frequency, within said digital imaging system that is deteriorating.

9. The method of claim 1, wherein, in advance of determining said banding frequency information, further comprising:
discarding segmented regions; and
merging said segmented regions within said plurality of segmented regions based upon a respective size of said segmented regions.

10. A system for identifying a color separation in which a banding defect originates, said system comprising:
a memory;
a storage medium for storing data; and
a processor in communication with said storage medium and said memory, said processor executing machine readable instructions for performing the method of:
scanning a plurality of digital images, each corresponding to a page printed by a digital imaging system whereon banding defects are intended to be detected and analyzed;
identifying, within each image of said scanned digital images, a plurality of segmented regions each comprising standard image regions of each image;
using region-based banding detection to detect banding defects in said plurality of scanned digital images;
calculating color values for each segmented region in which a banding defect has been detected;
identifying a color separation in which each of said detected banding defects originates based upon said color values and a set of reference vectors; and
initiating an activity associated with said digital imaging system in response to a color separation of the banding defect having been identified.

11. The system of claim 10, wherein said region-based banding detection comprises:
determining banding frequency information from at least one color parameter value within each of said identified segmented regions;
estimating a banding amplitude for each recurring banding frequency which repeats within said banding frequency information over said plurality of scanned digital images; and
detecting at least one banding defect based upon said estimated banding amplitude and said recurring banding frequency.

12. The system of claim 10, further comprising applying a weighting factor to said banding amplitude comprising any of: a region-average of K in original versions of said digital images, and a region-average of L*in said scanned digital images.

13. The system of claim 10, further comprising applying a weighting factor to said banding amplitude comprising an average area coverage of the segmented region wherein said banding defect originated.

14. The system of claim 13, wherein said average area coverage is estimated using an inverse printer model in an ICC destination profile of said digital document system.

15. The system of claim 10, wherein identifying said color separation in which said detected at least one banding defect originates comprises:
fitting a line using a subset of said color values to produce a fitted color vector; and
comparing said fitted color vector to said set of reference vectors, wherein a smallest difference between said fitted color vector and one of said reference vectors indicates the color separation in which said identified banding defect originated.

16. The system of claim 10, wherein identifying said color separation in which said detected at least one banding defect originates comprises:
calculating the distances between the color values and each reference color vector; and
comparing the statistics of said distances among said set of reference color values, the statistics including at least one of: average, median, and 95 percentile.

17. The system of claim 10, wherein said activity comprises any of: sending a control signal to said digital imaging system, and sending an alert to an operator of said digital imaging system, wherein said alert comprises any of: an indication of a deterioration of at least one component of said digital imaging system, and an indication of at least one part, based upon said recurring banding frequency, within said digital imaging system that is deteriorating.

18. The system of claim 10, wherein, in advance of determining said banding frequency information, further comprising:
discarding segmented regions; and
merging said segmented regions within said plurality of segmented regions based upon a respective size of said segmented regions.

19. A computer implemented method for identifying a color separation in which a banding defect originates, the method comprising:
- scanning a plurality of digital images, each corresponding to a page printed by a digital imaging system whereon banding defects are intended to be detected and analyzed;
- identifying, within each image of said scanned digital images, a plurality of segmented regions each comprising standard image regions of each image;
- using region-based banding detection to detect banding defects in said plurality of scanned digital images comprising:
  - determining banding frequency information from at least one color parameter value within each of said identified segmented regions;
  - estimating a banding amplitude for each recurring banding frequency which repeats within said banding frequency information over said plurality of scanned digital images; and
  - detecting at least one banding defect based upon said estimated banding amplitude and said recurring banding frequency;
- calculating color values for each segmented region in which a banding defect has been detected;
- identifying a color separation in which each of said detected banding defects originates based upon said color values and a set of reference vectors; and
- initiating an activity associated with said digital imaging system in response to a color separation of the banding defect having been identified.

20. The method of claim 19, further comprising applying a weighting factor to said banding amplitude comprising any of: a region-average of K in original versions of said digital images, and a region-average of L* in said scanned digital images.

21. The method of claim 19, further comprising applying a weighting factor to said banding amplitude comprising an average area coverage of the segmented region wherein said banding defect originated.

22. The method of claim 21, wherein said average area coverage is estimated using an inverse printer model in an ICC destination profile of said digital document system.

23. The method of claim 19, wherein identifying said color separation in which said detected at least one banding defect originates comprises:
- fitting a line using a subset of said color values to produce a fitted color vector; and
- comparing said fitted color vector to said set of reference vectors, wherein a smallest difference between said fitted color vector and one of said reference vectors indicates the color separation in which said identified banding defect originated.

24. The method of claim 19, wherein identifying said color separation in which said detected at least one banding defect originates comprises:
- calculating the distances between the color values and each reference color vector; and
- comparing the statistics of said distances among said set of reference color values, the statistics including at least one of: average, median, and 95 percentile.

25. The method of claim 19, wherein said activity comprises any of: sending a control signal to said digital imaging system, and sending an alert to an operator of said digital imaging system, wherein said alert comprises any of: an indication of a deterioration of at least one component of said digital imaging system, and an indication of at least one part, based upon said recurring banding frequency, within said digital imaging system that is deteriorating.

* * * * *